(12) United States Patent
Durham et al.

(10) Patent No.: US 9,795,271 B2
(45) Date of Patent: Oct. 24, 2017

(54) VARIABLE POSITION HYDRAULICALLY ACTUATED DIVERTER FOR AN APPLIANCE

(71) Applicant: General Electric Company, Schenectady, NY (US)

(72) Inventors: Kyle Edward Durham, Louisville, KY (US); Craig Curtis, Crestwood, KY (US); Christopher Brandon Ross, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 118 days.

(21) Appl. No.: 14/814,937

(22) Filed: Jul. 31, 2015

(65) Prior Publication Data

US 2017/0027406 A1    Feb. 2, 2017

(51) Int. Cl.
*A47L 15/42* (2006.01)
*F16K 31/524* (2006.01)
*A47L 15/23* (2006.01)
*F16K 11/074* (2006.01)

(52) U.S. Cl.
CPC .......... *A47L 15/4221* (2013.01); *A47L 15/23* (2013.01); *F16K 11/074* (2013.01); *F16K 31/52483* (2013.01)

(58) Field of Classification Search
CPC .................................................. A47L 15/4221
See application file for complete search history.

(56) References Cited

U.S. PATENT DOCUMENTS

| | | | |
|---|---|---|---|
| 3,648,931 A | * | 3/1972 | Jacobs ................ A47L 15/4221 134/176 |
| 7,047,986 B2 | | 5/2006 | Ertle et al. |
| 8,834,648 B2 | | 9/2014 | Fountain |
| 8,915,257 B2 | | 12/2014 | Büsing et al. |
| 8,978,674 B2 | | 3/2015 | Büsing et al. |
| 2010/0139698 A1 | | 6/2010 | Gnadinger et al. |
| 2012/0266924 A1 | | 10/2012 | Boyer |
| 2012/0318389 A1 | | 12/2012 | Holstein |
| 2013/0000762 A1 | | 1/2013 | Buddharaju |
| 2013/0118620 A1 | * | 5/2013 | Zhou ..................... B05B 1/1636 137/625.46 |
| 2014/0182625 A1 | | 7/2014 | Lee et al. |

* cited by examiner

*Primary Examiner* — Jason Ko
(74) *Attorney, Agent, or Firm* — Dority & Manning, P.A.

(57) ABSTRACT

A passive diverter is provided that does not require a dedicated motor to switch between multiple outlet ports. The diverter uses the forces provided by a flow of fluid from a pump to switch between different outlet ports and supply one or more spray assemblies or other fluid-using elements. A separate motor to power the diverter is not required, which allows a savings in costs and space. In addition, a secondary set of ramps may provide a manner in which to "zero" the angular position of the diverter, i.e., place the diverter in a known, home position. This can reduce the additional cost, weight, and complexity of including additional sensors to determine the angular position of the diverter.

20 Claims, 15 Drawing Sheets

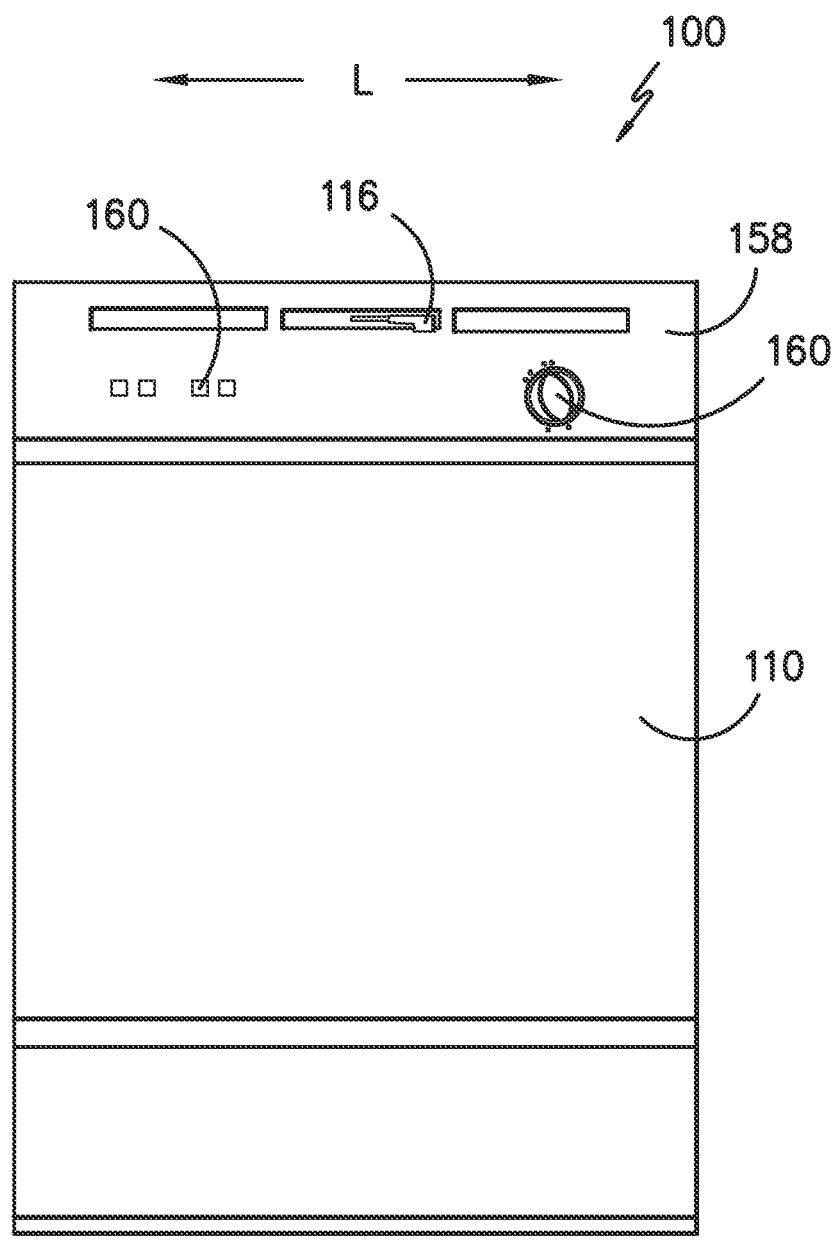
FIG. -1-

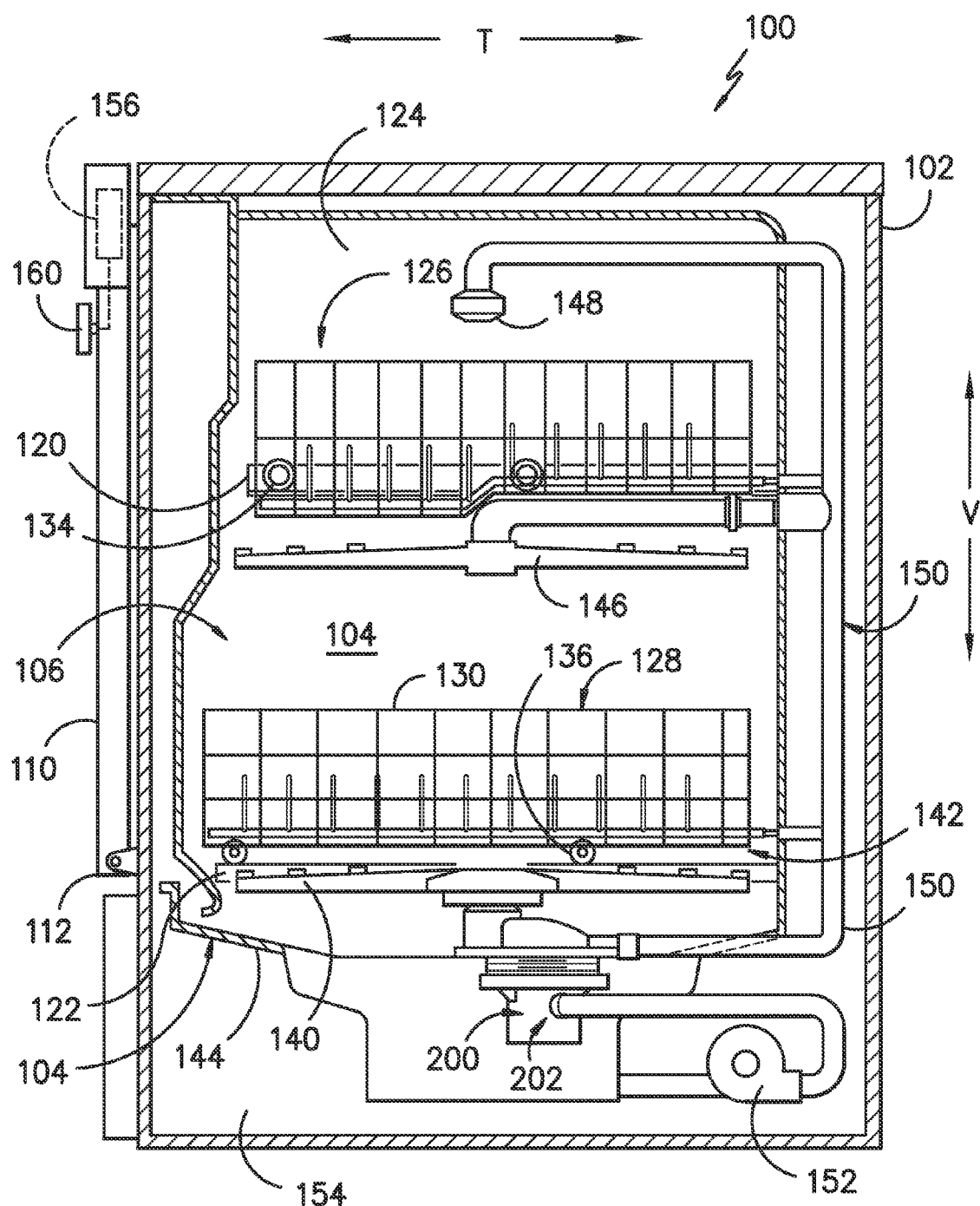
FIG. -2-

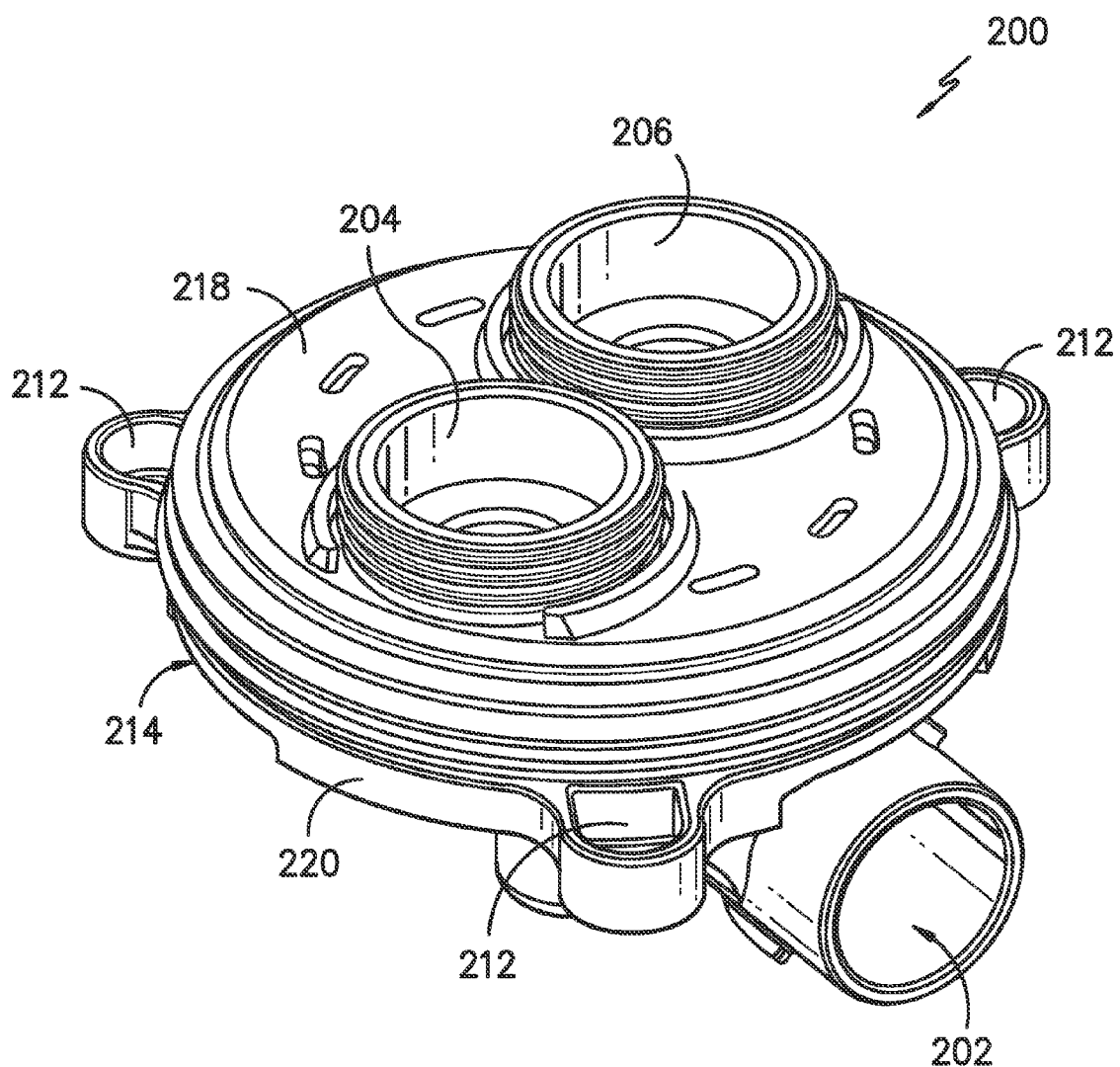
FIG. -3-

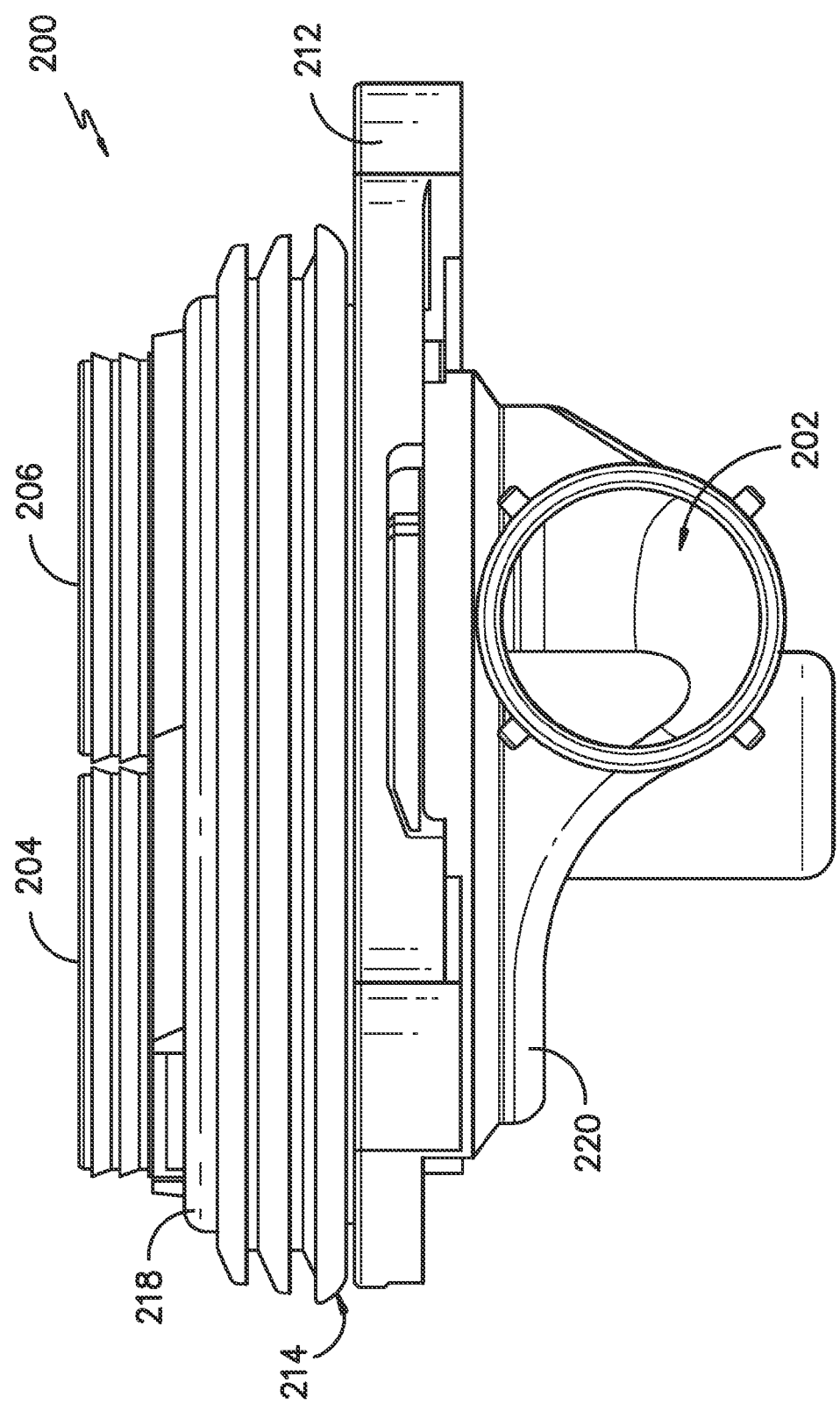
FIG. -4-

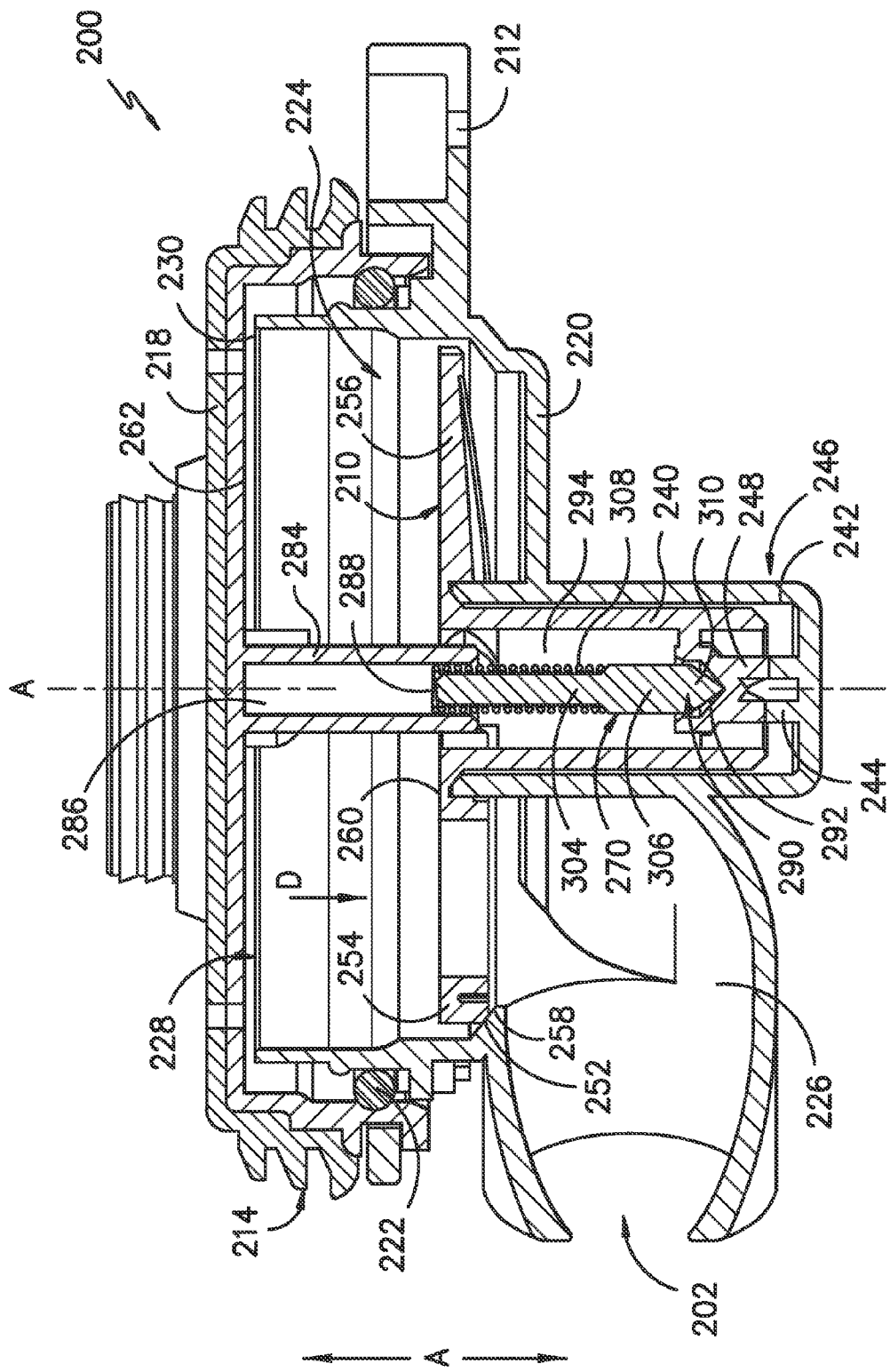
FIG. -5-

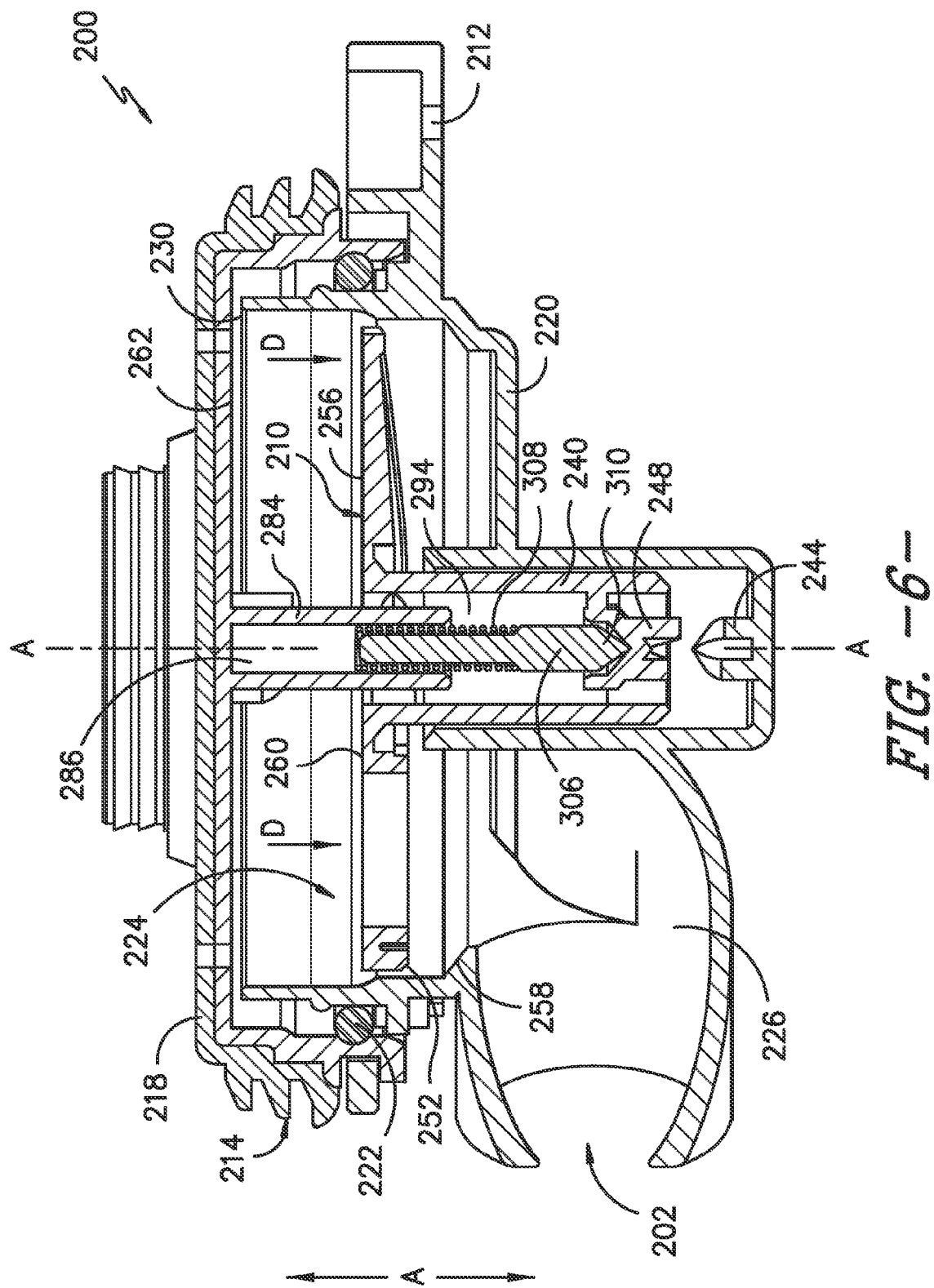
FIG. -6-

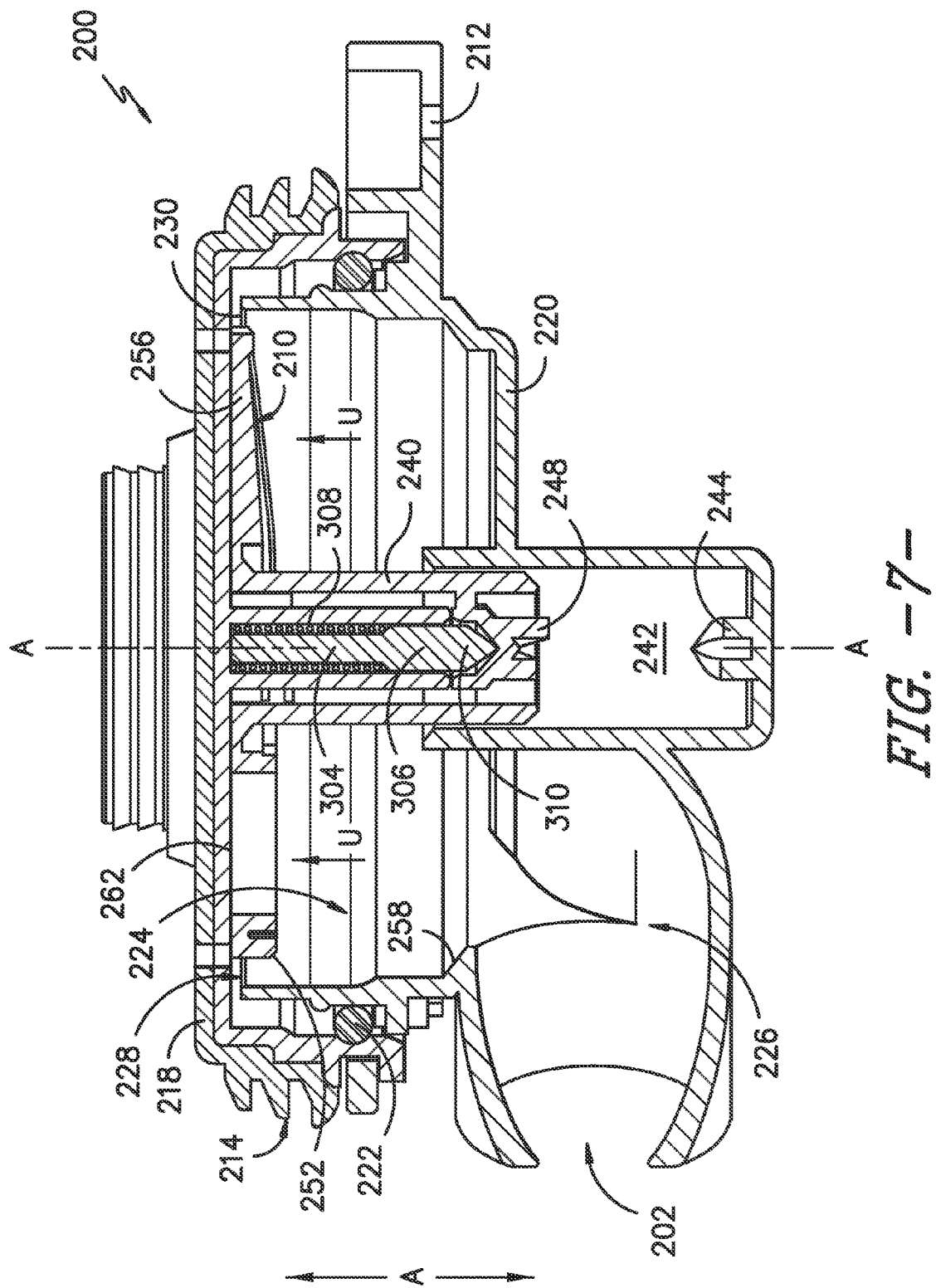

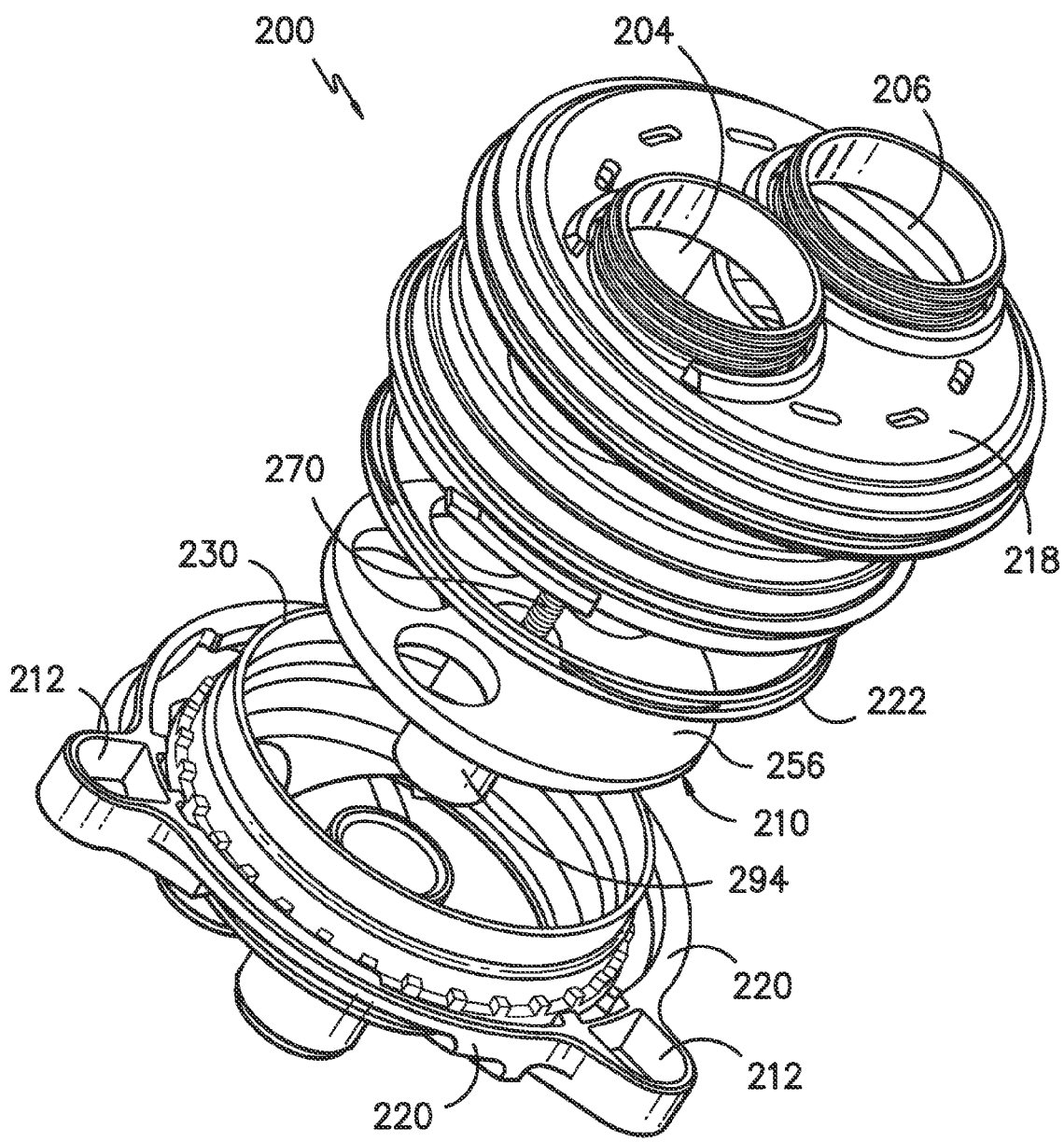
FIG. -8-

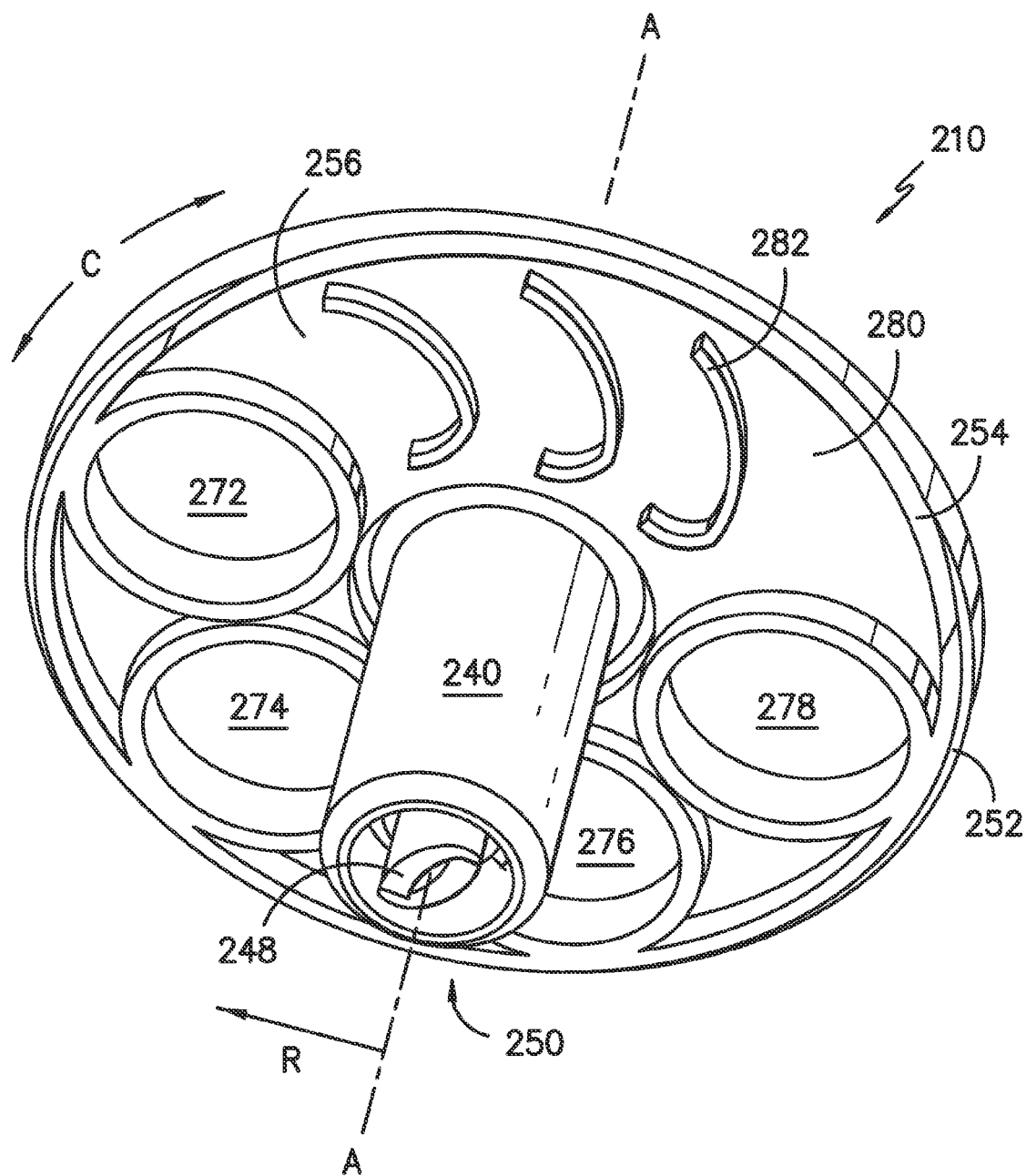
FIG. -9-

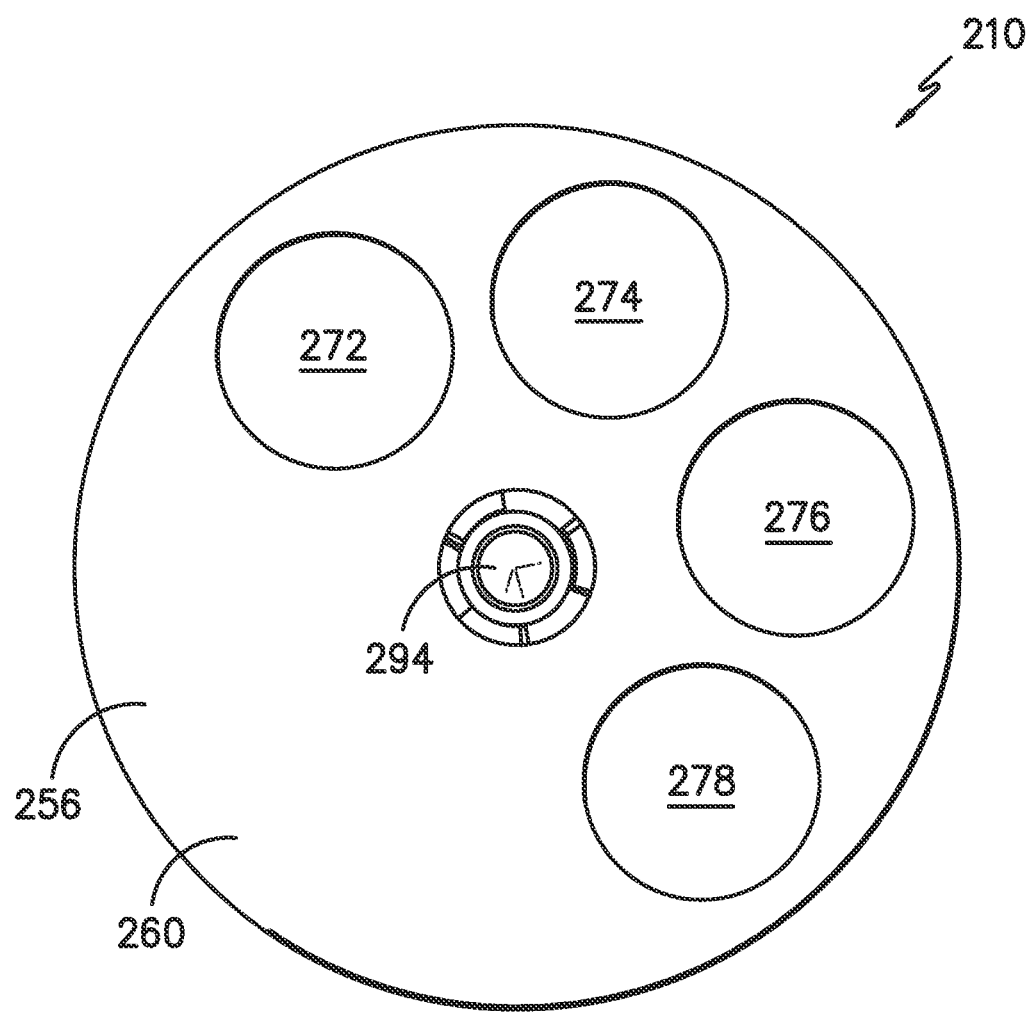
FIG. -10-

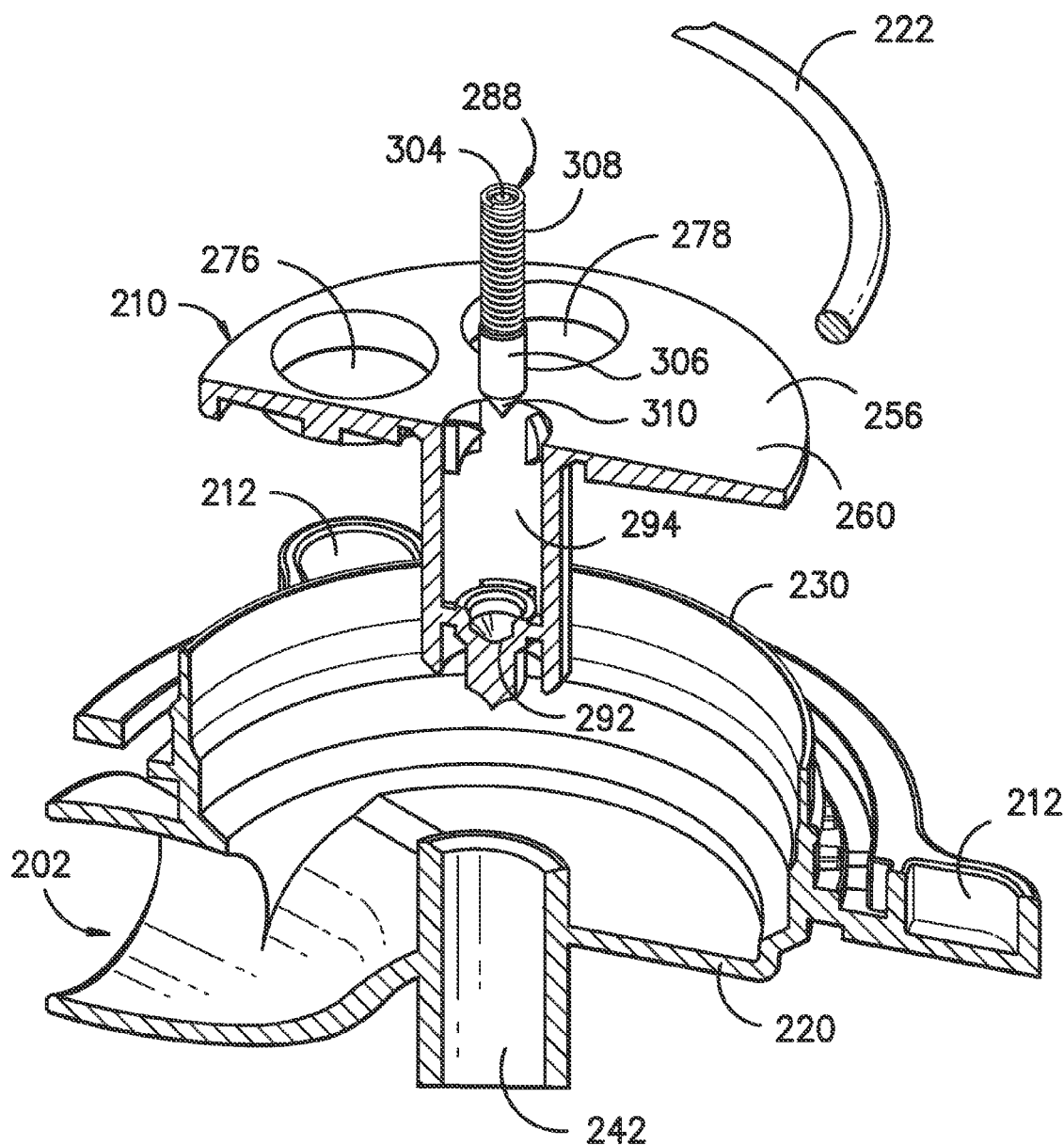
FIG. -11-

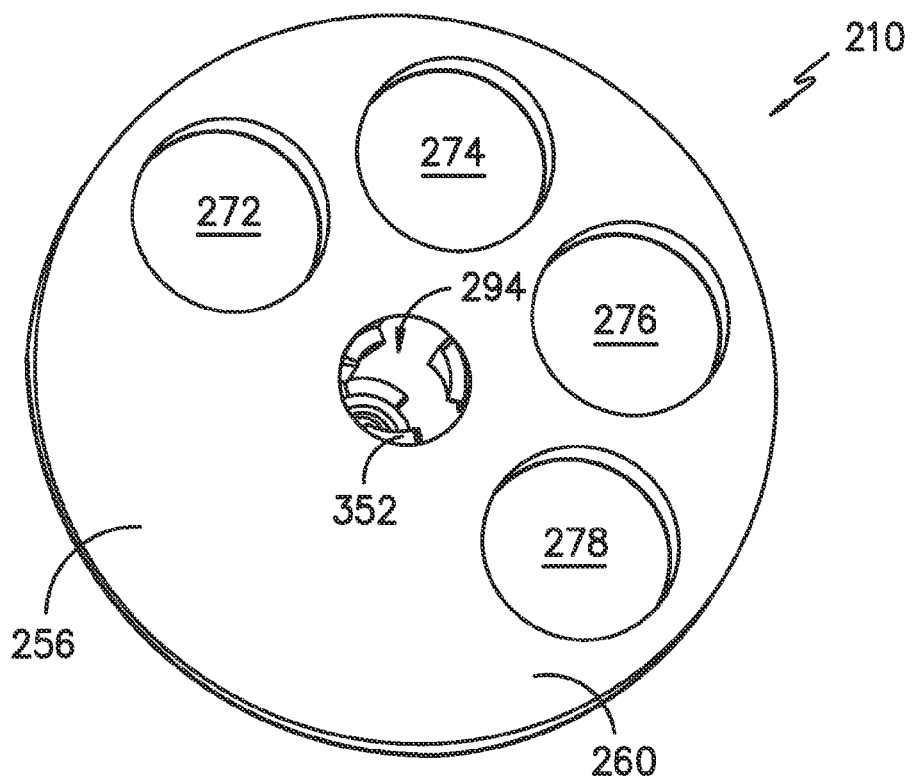
FIG. -12-
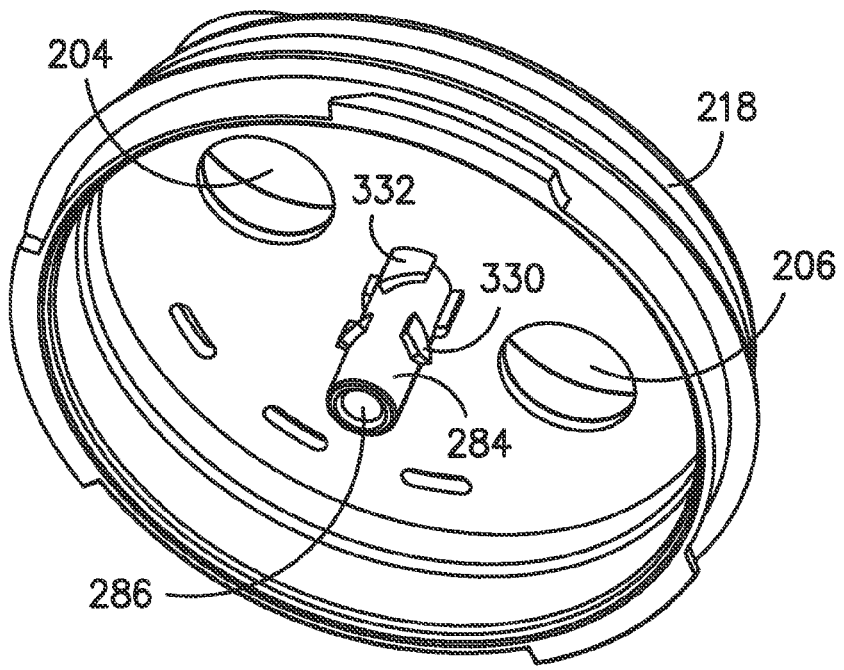
FIG. -13-

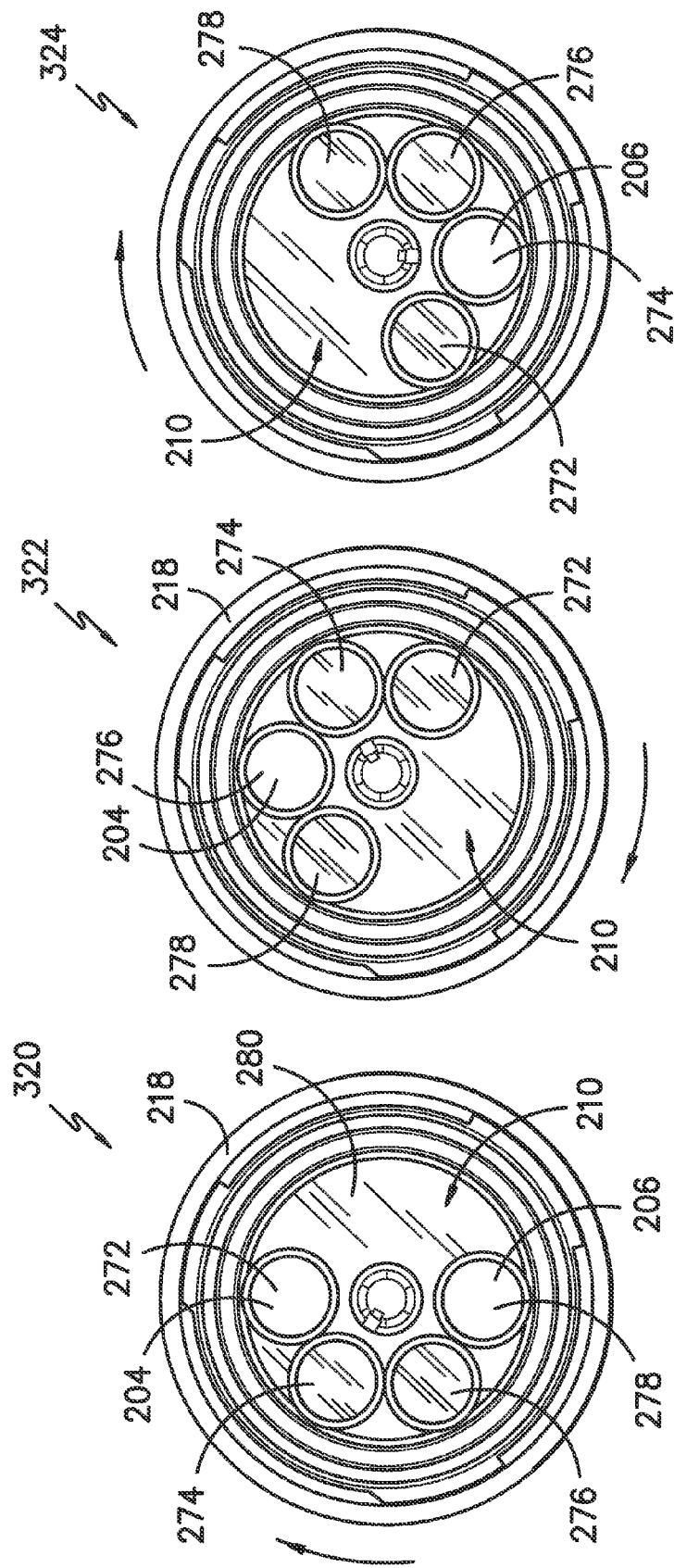
FIG. -14-

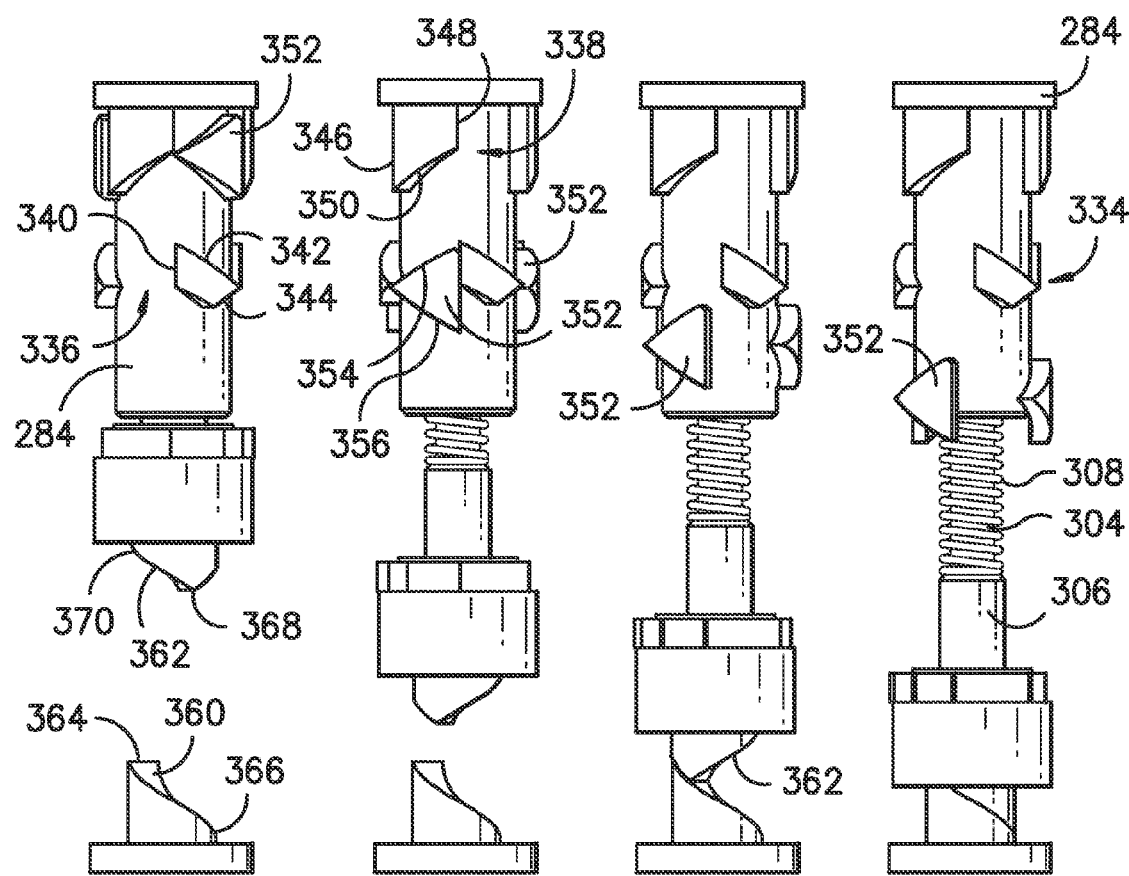
FIG. -15-

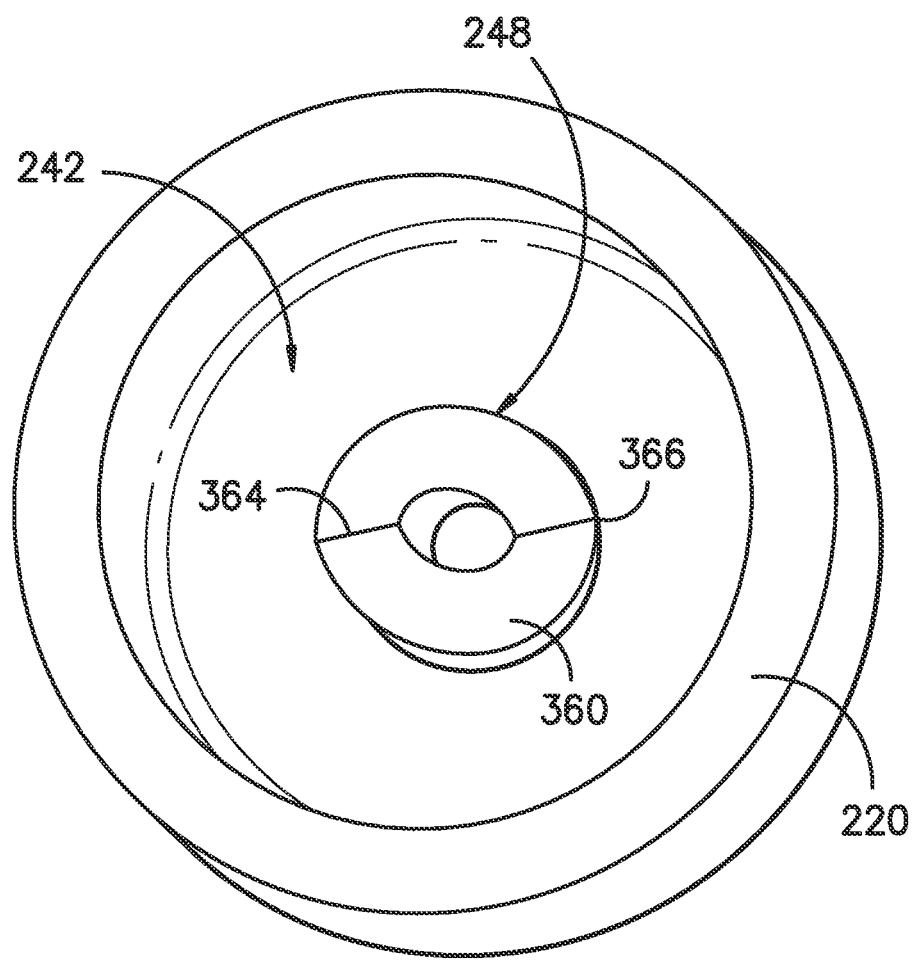
FIG. -16-

VARIABLE POSITION HYDRAULICALLY ACTUATED DIVERTER FOR AN APPLIANCE

FIELD OF THE INVENTION

The subject matter of the present disclosure relates generally to a diverter for an appliance.

BACKGROUND OF THE INVENTION

Dishwasher appliances generally include a tub that defines a wash compartment. Rack assemblies can be mounted within the wash compartment of the tub for receipt of articles for washing. Spray assemblies within the wash compartment can apply or direct wash fluid towards articles disposed within the rack assemblies in order to clean such articles. Multiple spray assemblies can be provided including e.g., a lower spray arm assembly mounted to the tub at a bottom of the wash compartment, a mid-level spray arm assembly mounted to one of the rack assemblies, and/or an upper spray assembly mounted to the tub at a top of the wash compartment. Other configurations may be used as well.

A dishwashing appliance is typically equipped with at least one pump for circulating fluid through the spray assemblies. However, due to e.g., government regulations related to energy and/or water usage, the pump may not be able to supply fluid to all spray assemblies at the same time. Accordingly, a dishwashing appliance that can be configured to selectively control the flow through different spray assemblies or other fluid elements would be useful.

Certain conventional dishwashing appliances use a device, referred to as a diverter, to control the flow of fluid in the dishwashing appliance. For example, the diverter can be used to selectively control which flow assemblies receive a flow of fluid. In one construction, the diverter uses an electrically powered motor to rotate an element between different ports for fluid control. The motor adds a significant expense to the overall manufacturing cost of the dishwashing appliance and must be separately controlled during cleaning operations so that the proper flow is occurring.

Additionally, the motor is typically positioned below the diverter, which is positioned below the sump portion of the appliance. As such, significant space is consumed which can reduce the space available in the dishwashing compartment for placement of dishes, glasses, silverware, and other items for cleaning.

In another construction, a diverter uses a hydraulically actuated rotation mechanism to rotate the diverter valve such that it rotates between flow assemblies without the need for a motor. Notably, however, this type of diverter requires additional means for determining its angular position at any given time. For example, one method used for determining the angular position of such a diverter is placing a magnet in a rotating portion of the diverter valve and using a stationary sensor, e.g., a Hall effect sensor, to determine the position of the magnet. However, such means for determining the angular position of the diverter valve require additional parts, resulting in additional cost and complexity.

Thus, a hydraulically actuated diverter that does not require a separate angular position sensor would be beneficial, resulting in a savings in both costs and space.

BRIEF DESCRIPTION OF THE INVENTION

The present invention provides a passive, hydraulically actuated diverter, i.e., a diverter that does not require a dedicated motor to switch between multiple outlet ports. The diverter uses the forces provided by a flow of fluid from a pump to switch between different outlet ports and supply one or more spray assemblies or other fluid-using elements. A separate motor to power the diverter is not required, which allows a savings in costs and space. Moreover, a secondary set of ramps may provide a manner in which to "zero" the angular position of the diverter, i.e., place the diverter in a known, home position. This can reduce the additional cost, weight, and complexity of including additional sensors to determine the angular position of the diverter. Additional aspects and advantages of the invention will be set forth in part in the following description, may be apparent from the description, or may be learned through practice of the invention.

In one exemplary embodiment, the present invention provides a dishwasher appliance. The dishwasher appliance includes a wash chamber for receipt of articles for washing and a pump for providing fluid flow for cleaning the articles. A diverter receives fluid flow from the pump and includes, a plurality of outlet ports for providing fluid to the wash chamber and a housing defining a chamber. The chamber fluidly connects a fluid inlet and a fluid outlet such that a fluid may flow into the chamber through the fluid inlet and out of the chamber through the fluid outlet to one or more of the outlet ports. The housing also defines a cylindrically-shaped well and a first ramped element is positioned within a distal end of the well. The diverter may further include a valve positioned within the fluid outlet that is rotatable about an axis and movable along an axial direction between a first position and a second position. The valve defines radial and circumferential directions, and includes a disk defining a plurality of apertures for selectively controlling fluid flow from the fluid outlet to one or more of the outlet ports, the apertures being spaced apart along a circumferential direction. A cylindrically-shaped shaft is connected to the disk, extends along the axial direction, and is slidably received within the well of the housing. The shaft defines an interior channel, and a plurality of cams is positioned on the cylindrical shaft near the disk and project radially inward from the cylindrical shaft into the interior channel. A second ramped element is positioned near a distal end of the shaft. A boss extends along the axial direction from the housing into the interior channel of the valve. A plurality of guide elements is positioned on the boss near the housing and extends radially outward from the boss. A biasing element extends between the boss and the valve and is configured to urge the valve towards the first position. The first ramped element and the second ramped element are configured to contact each other when the valve moves into the first position so as to cause the valve to rotate into a base angular position. The guide elements and the cams are configured to contact each other when the valve moves into the second position so as to cause the valve to rotate incrementally through a plurality of selected angular positions for fluid flow through one more outlet ports.

In another exemplary embodiment, the present invention provides a passive diverter for selectively controlling fluid flow in an appliance. A diverter receives fluid flow from the pump and includes, a plurality of outlet ports for providing fluid to a wash chamber and a housing defining a chamber. The chamber fluidly connects a fluid inlet and a fluid outlet such that a fluid may flow into the chamber through the fluid inlet and out of the chamber through the fluid outlet to one or more of the outlet ports. The housing also defines a cylindrically-shaped well and a first ramped element is positioned within a distal end of the well. The diverter may further include a valve positioned within the fluid outlet that is rotatable about an axis and movable along an axial direction between a first position and a second position. The valve defines radial and circumferential directions, and includes a disk defining a plurality of apertures for selectively controlling fluid flow from the fluid outlet to one or more of the outlet ports, the apertures being spaced apart along a circumferential direction. A cylindrically-shaped shaft is connected to the disk, extends along the axial direction, and is slidably received within the well of the housing. The shaft defines an interior channel, and a plurality of cams is positioned on the cylindrical shaft near the disk and project radially inward from the cylindrical shaft into the interior channel. A second ramped element positioned near a distal end of the shaft. A boss extends along the axial direction from the housing into the interior channel of the valve. A plurality of guide elements is positioned on the boss near the housing and extend radially outward from the boss. A biasing element extends between the boss and the valve and is configured to urge the valve towards the first position. The first ramped element and the second ramped element are configured to contact each other when the valve moves into the first position so as to cause the valve to rotate into a base angular position. The guide elements and the cams are configured to contact each other when the valve moves into the second position so as to cause the valve to rotate incrementally through a plurality of selected angular positions for fluid flow through one more outlet ports. The disk is positioned within a path of fluid flow through the chamber such that valve is moved toward the second position by a predetermined rate of fluid flow through the fluid outlet of the chamber.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front view of an exemplary embodiment of a dishwashing appliance of the present invention.

FIG. 2 provides a side, cross-sectional view of the exemplary dishwashing appliance of FIG. 1.

FIG. 3 is a perspective view of an exemplary embodiment of a passive diverter of the present invention.

FIG. 4 is a side view of an exemplary embodiment of the exemplary passive diverter of FIG. 3.

FIG. 5 is a cross-sectional view of the exemplary passive diverter of FIG. 3 with a diverter valve shown in a first position.

FIG. 6 is also a cross-sectional view of the exemplary passive diverter of FIG. 3 with the diverter valve shown in an intermediate position between the first position and a second position.

FIG. 7 is also a cross-sectional view of the exemplary passive diverter of FIG. 3 with the diverter valve shown in the second position.

FIG. 8 is an exploded view of the exemplary passive diverter of FIG. 3.

FIG. 9 is a bottom, perspective view of the diverter valve of the exemplary passive diverter of FIG. 3.

FIG. 10 is a top view of the diverter valve of the exemplary passive diverter of FIG. 3.

FIG. 11 is an exploded, cross-sectional view of the exemplary passive diverter of FIG. 3.

FIG. 12 is a top, perspective view of the diverter valve of the exemplary passive diverter of FIG. 3.

FIG. 13 is a bottom, perspective view of a first portion of the housing of the exemplary passive diverter of FIG. 3.

FIG. 14 is a schematic, bottom view of a diverter valve inside the first portion of the housing of an exemplary diverter valve as the diverter valve is rotated between selected angular positions.

FIG. 15 is a schematic side view of a boss and a valve channel of the passive diverter of FIG. 3, showing the rotation of the valve channel as it moves from the second position to the first position.

FIG. 16 top, perspective view of a ramped feature in the second portion of the housing well of the exemplary passive diverter of FIG. 3.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to, dishes, pots, pans, silverware, and other cooking utensils and items that can be cleaned in a dishwashing appliance. The term "wash cycle" is intended to refer to one or more periods of time during the cleaning process where a dishwashing appliance operates while containing articles to be washed and uses a detergent and water, preferably with agitation, to e.g., remove soil particles including food and other undesirable elements from the articles. The term "rinse cycle" is intended to refer to one or more periods of time during the cleaning process in which the dishwashing appliance operates to remove residual soil, detergents, and other undesirable elements that were retained by the articles after completion of the wash cycle. The term "drying cycle" is intended to refer to one or more periods of time in which the dishwashing appliance is operated to dry the articles by removing fluids from the wash chamber. The term "fluid" refers to a liquid used for washing and/or rinsing the articles and is typically made up of water that may include additives such as e.g., detergent or other treatments. The use of the terms "top" and "bottom," or "upper" and "lower" herein are used for reference only as example embodiments disclosed herein are not limited to the vertical orientation shown nor to any particular configuration shown; other constructions and orientations may also be used.

FIGS. 1 and 2 depict an exemplary domestic dishwasher 100 that may be configured in accordance with aspects of the present disclosure. For the particular embodiment of FIGS.

1 and 2, the dishwasher 100 includes a cabinet 102 having a tub or inner liner 104 therein that defines a wash chamber 106. The tub 104 includes a front opening (not shown) and a door 110 hinged at its bottom 112 for movement between a normally closed vertical position (shown in FIGS. 1 and 2), wherein the wash chamber 106 is sealed shut for washing operation, and a horizontal open position for loading and unloading of articles from the dishwasher 100. Latch 116 is used to lock and unlock door 110 for access to chamber 106.

Upper and lower guide rails 120, 122 are mounted on tub side walls 124 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by the racks 126, 128.

The dishwasher 100 further includes a lower spray-arm assembly 140 that is rotatably mounted within a lower region 142 of the wash chamber 106 and above a tub sump portion 144 so as to rotate in relatively close proximity to rack assembly 128. A mid-level spray-arm assembly 146 is located in an upper region of the wash chamber 106 and may be located in close proximity to upper rack 126. Additionally, an upper spray assembly 148 may be located above the upper rack 126.

The lower and mid-level spray-arm assemblies 142, 146 and the upper spray assembly 148 are part of a fluid circulation assembly 150 for circulating water and dishwasher fluid in the tub 104. The fluid circulation assembly 150 also includes a pump 152 positioned in a machinery compartment 154 located below the tub sump portion 144 (i.e., bottom wall) of the tub 104, as generally recognized in the art. Pump 152 receives fluid from sump 144 and provides a flow to the inlet 202 of a passive diverter 200 as more fully described below.

Each spray-arm assembly 140, 146 includes an arrangement of discharge ports or orifices for directing washing liquid received from diverter 200 onto dishes or other articles located in rack assemblies 126 and 128. The arrangement of the discharge ports in spray-arm assemblies 140, 146 provides a rotational force by virtue of washing fluid flowing through the discharge ports. The resultant rotation of the spray-arm assemblies 140, 146 and the operation of spray assembly 148 using fluid from diverter 200 provides coverage of dishes and other dishwasher contents with a washing spray. Other configurations of spray assemblies may be used as well.

The dishwasher 100 is further equipped with a controller 156 to regulate operation of the dishwasher 100. The controller 156 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 156 may be positioned in a variety of locations throughout dishwasher 100. In the illustrated embodiment, the controller 156 may be located within a control panel area 158 of door 110 as shown in FIGS. 1 and 2. In such an embodiment, input/output ("I/O") signals may be routed between the control system and various operational components of dishwasher 100 along wiring harnesses that may be routed through the bottom 112 of door 110. Typically, the controller 156 includes a user interface panel/controls 160 through which a user may select various operational features and modes and monitor progress of the dishwasher 100. In one embodiment, the user interface 160 may represent a general purpose I/O ("GPIO") device or functional block. In one embodiment, the user interface 160 may include input components, such as one or more of a variety of electrical, mechanical or electro-mechanical input devices including rotary dials, push buttons, and touch pads. The user interface 160 may include a display component, such as a digital or analog display device designed to provide operational feedback to a user. The user interface 160 may be in communication with the controller 156 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 160, different configurations may be provided for racks 126, 128, and other differences may be applied as well.

FIGS. 3 and 4 provide a top, perspective view and a side view, respectively, of an exemplary embodiment of a passive diverter 200 of the present invention. Passive diverter 200 has a fluid inlet 202 for receiving a flow of fluid from pump 152 that is to be supplied to spray assemblies 140, 146, and/or 148 as well as other fluid-using components during cleaning operations. As stated, pump 152 receives fluid from e.g., sump 144 and provides a fluid flow to diverter 200.

For this exemplary embodiment, diverter 200 includes a plurality of outlet ports—shown in FIG. 3 and FIG. 4 as first outlet port 204 and a second outlet port 206. However, in other embodiments of the invention, three, four, or more than four outlet ports may be used with diverter 200 depending upon e.g., the number of switchable ports desired for selectively placing pump 152 in fluid communication with different fluid-using elements of appliance 100. Diverter 200 includes a valve 210 (see, e.g., FIG. 9), more fully described below, that can be selectively switched between ports 204 and 206 without using a separate motor for such purpose.

By way of example, first outlet port 204 can be fluidly connected with upper spray assembly 148 and lower spray arm assembly 140 and second outlet port can be fluidly connected with mid-level spray arm assembly 146. Other connection configurations may be used as well. As such, the rotation of valve 210 in passive diverter 200 can be used to selectively place pump 152 in fluid communication with spray assemblies 140, 146, or 148 by way of outlet ports 204 and 206, as described in an exemplary embodiment below. Diverter 200 includes multiple apertures 212 that allow for fastening diverter 200 to the sump 142 of wash tub 104 (FIG. 2).

Referring now to FIGS. 3 through 8, diverter 200 is constructed from a housing 214 that includes a first portion 218 and a second portion 220. An O-ring 222 provides a fluid seal therebetween. Housing 214 defines a chamber 224 into which fluid flows through its fluid inlet 226. Chamber 224 also defines a fluid outlet 228, which is formed by the circular edge 230 at the top of second portion 220 (FIGS. 5 through 7). In this manner, the chamber may provide fluid communication into the chamber 224 through the fluid inlet 226 and out of the chamber through the fluid outlet 228 to one or more of the outlet ports 204, 206.

Valve 210 is positioned within fluid outlet 228 of chamber 224 and defines a radial direction R and a circumferential direction C (see, e.g., FIG. 9). More particularly, valve 210 includes a cylindrically-shaped shaft 240 that extends along the axial direction and is received into a cylindrically-shaped well 242 formed by second portion 220 of housing 214. This cylindrically-shaped shaft 240 is slidably received within the well 242 of the housing 214, such that valve 210 is rotatable about axis A-A relative to housing 214 and movable back and forth along axial direction A.

For this exemplary embodiment, a first ramped element 244 is positioned within a distal end 246 of well 242. A second ramped element 248 is positioned near a distal end 250 of valve shaft 240. As will be described below, the first ramped element 244 and the second ramped element 248 are used to selectively position the diverter valve 210 in a known angular position.

As can be seen by comparing FIGS. 5 through 7, valve 210 is movable along the axial direction A (or along axis A-A, which is parallel to the axial direction A) between a first position shown in FIG. 5 and a second position shown in FIG. 7. An intermediate position of the valve 210 is shown in FIG. 6. In the first position shown in FIG. 5, valve 210 rests on second portion 220 of housing 214. More particularly, valve 210 may include a frustoconical surface 252 positioned on the distal end of a flange 254. In turn, flange 254 projects along axial direction A from the circular main body, or disk 256, of valve 210 towards second portion 220 of housing 214. In the first position, frustoconical surface 252 rests in a complementary manner on an interior surface 258 of second portion 220 that is also frustoconical in shape. In the second position shown in FIG. 7, valve 210 is pressed against first portion 218 of housing 214. For this exemplary embodiment, a top surface 260 (FIG. 10) of valve 210 contacts an interior surface 262 of first portion 218.

Movement of valve 210 back and forth between the first position shown in FIG. 5 and the second position shown in FIG. 7 is provided by two opposing forces: i) a flow of water passing through diverter 200 that is counteracted by ii) a biasing element 270. More particularly, when pump 152 is off, biasing element 270 pushes along axial direction A against valve 210 and forces it downward along axis A-A (arrows D) to the position shown in FIG. 5. Conversely, when there is a sufficient flow of fluid F through diverter housing 200, the momentum of fluid exiting chamber 224 through the fluid outlet 228 of housing 214 will impact valve 210. As the fluid passes through apertures 272, 274, 276, 278 to exit diverter 200 through one of the outlet ports 204, 206, this momentum overcomes the force provided by biasing element 270 so as to shift valve 210 along axial direction A (arrows U) away from diverter bottom 220 towards diverter top 218 to a second position shown in FIG. 7.

Flange 254 assists in capturing the momentum provided by fluid flow through fluid outlet 220. In addition, as shown in FIG. 9, a bottom surface 280 of disk 256 of valve 210 may further include a plurality of arcuate ribs 282. These arcuate ribs 282 capture the momentum and of the fluid flow and tend to cause the valve 210 to rotate in only one direction. The arcuate ribs 282 cause the valve 210 to rotate in a clockwise manner about axis A when viewed from bottom of valve 210. As shown in FIG. 9, the disk 256 may include three arcuate ribs 282. However, one skilled in the art will appreciate that any number of arcuate ribs may be used. Similarly, the ribs may be different size, shape, or orientation depending on the needs of the application.

Valve 210 will remain in the second position until the fluid flow ends or drops below a certain flow rate. Then, biasing element 270 urges valve 210 along axial direction A away from diverter top 218 towards diverter bottom 220 and back into the first position shown in FIG. 5. As shown in the exemplary embodiment of FIGS. 5 through 7 and 11, the biasing element 270 extends between a boss 284 of first portion 218 and the valve shaft 240 and is configured to urge the valve 210 toward the first position. In this regard, boss 284 may define a recess 286 into which a top end 288 of the biasing element 270 may be slidably received, and a bottom end 290 of the biasing element 270 may be received in a conically-shaped seat 292 defined, for example, at the bottom of an interior channel 294 of valve shaft 240. In the illustrated embodiment, conically-shaped seat 292 is disposed opposite the second ramped element 248 that may be used to return the valve 210 to a known angular position, as described in detail below. The conically-shaped seat 292 and second ramped element 248 may be formed as an integral piece within the interior channel 294, or may be constructed of separate pieces.

As best shown in FIG. 11, the biasing element 270 may be, for example, a plunger 302 including a plunger shaft 304 connected with a plunger head 306. The plunger head 306 may have a larger diameter than the plunger shaft 304 and a compression spring 308 may be received onto the plunger shaft 304 and compressed against the plunger head 306. In the exemplary embodiment, the plunger head 306 has a conically-shaped tip 310 that is received in the conically-shaped seat 292 disposed opposite the second ramped element 248. One skilled in the art will appreciate that the above-described biasing element 270 is only an example, and other types of biasing elements are possible. For example, in some embodiments, the biasing element may be a simple compression spring.

The movement of valve 210 back and forth along axis A-A between the first and second positions shown in FIGS. 5 and 7 also causes valve 210 to rotate about axis A-A so that apertures 272, 274, 276, 278 are switched between outlet ports 204 and 206. For this exemplary embodiment, a single movement in either direction (arrow U or arrow D) causes valve 210 to rotate 60 degrees. Accordingly, valve 210 rotates about axis A-A a full 120 degrees each time it is moved out of, and then returned to, the second position (FIG. 7). This is true as long as the valve 210 does not reach the first position (FIG. 5), which resets the value to a "home" position as described below.

As noted above, disk 256 of valve 210 may include a plurality of apertures 272, 274, 276, 278 which may be selectively placed in fluid communication with one or more outlet ports 204, 206 to provide fluid flow to spray assemblies 140, 146, and 148. For example, as shown in the illustrated embodiment of FIGS. 9 and 10, disk 256 may include a first aperture 272, a second aperture 274, a third aperture 276, and a fourth aperture 278. The disk 256 can be rotated so as to place one or more of its apertures 272, 274, 276, 278 in fluid communication with one or more of outlet ports 204, 206. As shown in FIG. 13, the fluid outlet ports 204, 206 are spaced apart circumferentially on the first portion 218 of the housing 214 by 180 degrees. Apertures 272, 274, 276, 278 are spaced circumferentially around disk 256 such that apertures 272 and 278 are spaced apart by 180 degrees and apertures 274 and 276 are placed circumferentially between apertures 272 and 278 on one half of disk 256 with 60 degree spacing between the centers of apertures 272, 274, 276, 278.

Notably, this geometry of outlet ports 204, 206 and apertures 272, 274, 276, 278 provides three modes of operation when disk 256 is configured to rotate in 120 degree increments. As described below, this rotation is achieved by using three cams along with three upper and three lower guide elements to provide 120 degrees of rotation. This operation is shown schematically in FIG. 14, which shows the disk 256 of valve 210 rotating clockwise (as viewed looking up on first portion 218) within the first portion 218 of the housing 214 in 120 degree increments. A first angular position 320 corresponds with a dual-spray configuration because apertures 272 and 278 are each in fluid communication with one of outlet ports 204 and 206 while apertures 274 and 276 are blocked. Therefore, when valve 210 is rotated to place disk 256 in a first angular position 320, a flow of fluid from pump 152 is supplied to spray assemblies 140, 146, and 148. Similarly, when the disk 256 is rotated within housing 14 to a second angular position 322, which is 120 degrees from the first angular position 320, aperture 276 is in fluid communication with fluid outlet port 204, but apertures 272, 274, and 278 are blocked, as is fluid outlet port 206. In this manner, a flow of fluid from pump 152 is supplied only to spray assemblies 140 and 148. When the disk 256 is rotated another 120 degrees to a third angular position 324, aperture 274 is in fluid communication with fluid outlet port 206, but apertures 272, 276, and 278 are blocked, as is fluid outlet port 204. In this manner, a flow of fluid from pump 152 is supplied only to spray assembly 148. Finally, when the disk 256 is rotated another 120 degrees, the disk 256 has returned to its first angular position 320, and dual-spray operation is resumed. As such, passive diverter 200 can be used to selectively provide fluid flow from pump 152 through outlet ports 204 and 206 in three operation modes. The manner in which disk 256 of valve 210 is rotated in 120 degree increments, thus indexing between the three modes of operation, is described in more detail below.

Although the illustrated embodiment shows a valve 210 and disk 256 having four apertures 272, 274, 276, 278 and rotating in 120 degree increments, one skilled in the art will appreciate that this configuration is provided only as an example. The disk 256 may have more or fewer apertures and may be indexed at different increments. In addition, the increments may not be constant, but may instead vary according to the needs of the application. Similarly, the housing 214 may have more than two outlet ports, and the scheduling of fluid communication between disk 256 and the outlet ports may be manipulated as desired.

Referring now to FIG. 13, a cylindrically-shaped boss 284 extends along axis A-A from first portion 218 of housing 214 into an interior channel 294 (FIGS. 10 through 12) defined by valve 210. As mentioned above, boss 284 defines recess 286 into which a first end 288 of biasing element 270 is received. Boss 284 also includes a plurality of guide elements 330 and 332 that are spaced apart from each other along circumferential direction C and extend radially outward from the boss 284. A first plurality of lower guide elements 330, are located near a midpoint 334 of boss 284 while a second plurality of upper guide elements 332 are located near diverter top 218. Upper and lower guide elements 330, 332 are spaced apart along axial direction A and are also offset from each other along circumferential direction C. More particularly, as best seen in FIG. 15, along axial direction A, each of the upper guide elements 332 is aligned with a gap 336 positioned between a respective pair of the lower guide elements 330. Conversely, each of the lower guide elements 330 is aligned with a gap 338 between a respective pair of the upper guide elements 332.

Referring now to FIGS. 13 and 15, each of the lower guide elements 330 may be a projection having a straight side 340 that is parallel to the axial direction. In addition, lower guide elements 330 may include an upper contact face 342 extending from straight side 340 and forming a non-zero, acute angle from the axial direction and a lower contact face 344 extending from upper contact face 342 and forming a non-zero, acute angle from the axial direction. Each of the upper guide elements 332 may be a projection having a pair of straight sides 346, 348 that are parallel to the axial direction. In addition, upper guide elements 332 may include a contact face 350 extending between the pair of straight sides 346, 348 and forming a non-zero, acute angle from the axial direction. The upper and lower guide elements 330, 332 may thus define contact faces at non-zero angles between zero and 90 degrees from the axial direction A. For the exemplary embodiment shown, this angle is about 45 degrees. In another embodiment, this angle is about 42 degrees. In still another embodiment, this angle is about 40 degrees to about 50 degrees from the axial direction. However, other angles may be used as well.

As stated and shown, boss 284 is received into an interior channel 294 defined by the shaft of valve 210. Referring to FIGS. 10 through 12, a plurality of cams 352 are positioned on the interior channel 294 of the cylindrical valve shaft 240 and project radially inward (i.e., along radial direction R) from the cylindrical shaft 240 into the interior channel 294. As best shown in FIG. 15, each cam 352 includes an upper contact face 354 and a lower contact face 356. Each cam 352 is spaced apart from adjacent cams 352 along the circumferential direction, and each cam 352 is at the same axial position along the axial direction. In addition, each cam 352 is shown as a triangular shaped projection. However, one skilled in the art will appreciate that this is only an exemplary embodiment of the plurality of cams, and that different cam shapes, configurations, and spacing are contemplated as within the scope of the present invention.

Still referring to FIG. 15, as a flow of fluid overcomes biasing element 270 and valve 210 moves from the first position (FIG. 5) towards the second position (FIG. 7), upper contact face 354 of each cam 352 contacts upper guide element 332 at contact face 350. In this manner, valve 210 is caused to rotate 60 degrees so that each cam 352 moves into gap 338 between a pair of the upper guide elements 332. This movement is guided by contact face 350. In this second position (FIG. 7), apertures 272, 274, 276, 278 may be aligned with one of the outlet ports 204 and 206. As the flow of fluid is turned off, biasing element 270 causes valve 210 to move towards the first position (FIG. 5). During this movement, lower contact face 356 of each cam 352 contacts upper contact face 342 of guide element 330 and causes valve 210 to rotate another 60 degrees so that each cam 352 moves into a gap 336 between a pair of the lower guide elements 330. This movement is guided by contact face 342. Upon returning to the second position, valve 210 is again caused to rotate by 60 degrees as previously described so that apertures 272, 274, 276, 278 are switched to the next mode of operation, as discussed above. The process can be repeated to switch between modes of operation. In this manner, the guide elements 330, 332 and cams 352 are configured to contact each other when the valve 210 moves into the second position so as to cause the valve 210 to rotate incrementally through a plurality of selected angular positions to provide fluid flow through one or more outlet ports 204, 206.

As stated, the passive diverter 200 of the present invention may be used with more than two outlet ports and the disk 256 may have less than or more than four apertures. In such case, as will be understood by one of skill in the art using the teachings disclosed herein, the configuration of cams 352 and guide elements 336, 338 described above can be modified to provide the desired amount of rotation between the selected number of outlet ports. For example four cams along with four upper and four lower guide elements are used to provide 90 degrees of rotation between four outlet ports in another exemplary embodiment.

Accordingly, during operation of appliance 100, controller 156 can be programmed to operate pump 152 and control the position of valve 210. More specifically, when valve 210 is oscillating between the first position (FIG. 5) and the intermediate position (FIG. 6), such that first ramped element 244 and second ramped element 248 do not contact each other, the controller 156 can determine the current angular position of the valve 210 by counting the number of times the pump 152 has been cycled on and off. Notably, however, the controller 156 must know the initial angular position of the valve 210. For example, knowing the last outlet port through which fluid flow occurred, controller 156 can activate pump 152 to rotate valve 210 to the next outlet port in the direction of rotation of valve 210 so as to control the flow of fluid. Each time pump 152 is cycled off and back on to provide a flow of fluid through passive diverter 200 (e.g., during or between wash and rinse cycles), the controller 156 will "know" that valve 210 has been rotated to the next outlet port.

However, a variety of factors may affect the angular position of the valve 210, so the controller 156 may not always be able to accurately track the angular position of the valve 210. In addition, at certain times during operation of the washing machine appliance 100, it may be desirable to reset the angular position of the diverter valve 210 to a known position. This may be desirable when, for example, the controller 156 does not know the angular position, or when it is desirable to skip the next incremental angular position. To achieve this reset, first ramped element 244 and second ramped element 248 are configured to contact each other when the valve 210 moves into the first position so as to cause the valve 210 to rotate to a base angular position. The region in which the first and second ramped elements 244, 248 interact (e.g., between the intermediate position and the first position) may be referred to as the first region of axial movement. Similarly, the region in which the first and second ramped elements 244, 248 do not interact (e.g., between the intermediate position and the second position) may be referred to as the second axial region.

Referring now to FIGS. 9, 15, and 16, first ramped element 244 and second ramped element 248 are configured to interact such that they cause rotation of the valve 210 when it travels through the first axial region and reaches the first position. In this manner, first ramped element 244 is disposed in the second portion 220 of the housing 214 at a distal end 246 of the well 242 and defines an upwardly oriented first contact surface 360. The second ramped element 248 is disposed at a distal end 250 of the valve shaft 240 and defines a downwardly oriented second contact surface 362. The first ramped element 244 and the second ramped element 248 are in axial alignment, such that movement of the valve shaft 240 within the first axial region into the first position causes the first contact surface 360 and the second contact surface 362 to contact each other.

As shown in the illustrated embodiment, the first and second contact surfaces 360, 362 may be mirror images of each other. The first contact surface 360 may be defined between a peak 364 at a distal end of the first ramped element 244 and a valley 366 proximate to second portion 220 of housing 214. Similarly, the second contact surface 362 may be defined between a peak 364 at a distal end of the second ramped element 244 and a valley 366 at a proximate end. The first and second contact surfaces 360, 362 may be curved or straight, and are configured to ensure that when the first ramped element 244 and the second ramped element 248 come into axial contact, the first and second contact surfaces 360, 362 may slide relative to each other so as to rotate the valve shaft 240 to a base angular position. As shown in FIG. 15, when the valve shaft 240 reaches the first position, the peak 364 of the first ramped element 244 is adjacent the valley 370 of the second ramped element 248, and the valve 210 and valve shaft 240 have rotated to the base angular position. One skilled in the art will appreciate that mating ramped elements are only one way to ensure that valve returns to a base angular position, and other suitable mechanisms for achieving angular rotation are within the scope of the invention.

As described above, the first and second ramps 244, 248 are configured to interact when the valve 210 is moving axially within a first axial region and the cams 352 and guide elements 330, 332 are configured to interact as the valve 210 moves within a second axial region. Because biasing element 270 begins driving valve 210 toward the first position (i.e., downward) as soon as the flow of fluid is stopped, the duration of time that the pump 152 is turned off determines whether the valve 210 moves within the second axial region only, or whether the valve 210 reaches the first axial region. Therefore, by stopping the fluid flow through the diverter 200 for a short time period before restarting the flow, the valve 210 remains in the second axial region, thus making one incremental rotation for each time the fluid flow is temporarily stopped and started. In this manner, the dishwasher appliance 100 may iterate through various wash cycles by cycling the pump 152 off momentarily before switching it back on to deliver wash water to selected spray assemblies 140, 146, 148. However, by leaving the pump 152 off for a longer time period, the biasing element 270 causes the valve 210 to enter into the first axial region where, as discussed above, the valve 210 is rotated to its base angular position. In this manner, the "home" position of the diverter valve 210 may always be achieved by stopping the pump 152 for a predetermined amount of time longer than the short period of time used to cycle through the plurality of angular positions.

In order to ensure that the pump 152 may accurately control the rotation of the valve, it may be desirable to increase the difference between the short time period and the long time period. For example, if the off time required to cycle through the different angular positions is 0.5 seconds and the off time required to "home" the diverter valve 210 is 1 second, it may not be feasible for the controller 156 and pump 152 to consistently cycle through the plurality of positions without unintentionally entering the first axial region and setting the valve 210 to the base angular position. By slowing the descent speed of the valve 210, the controller 156 and pump 152 may be able to more accurately control the rotation of the valve 210.

Therefore, in some embodiments, the valve shaft 240 may form a tight fit within the well 242 of the second portion 218 of the housing 214. Alternatively, a seal may be used to restrict the flow of fluid between the well 242 and the chamber 224 of the housing 214. In this manner, fluid flow into and out of the well portion 242 of the housing 214 may be restricted, e.g., by forcing wash water to travel through an orifice in the center of the valve shaft 240 or within the restricted interface between the well 242 of the housing 214 and the outside of valve shaft 240. In this manner, for example, the valve shaft 240 and well 242 act as a damper to slow the axial speed of the valve 210, and the time it takes for the valve 210 to travel from the first axial region to the second axial region may be extended. By increasing this travel time, the controller 156 will be able to more accurately control the on/off time of the pump 152. In this manner, the controller 156 can ensure that the diverter 210 is set to the base angular position only when desired and is incrementally rotated only when desired.

One skilled in the art will appreciate that many factors determine how quickly the valve 210 travels between the first and second position, and there are many other ways in which the travel time of the valve may be adjusted. For example, the spring constant of biasing element 210, wash fluid viscosity, valve shaft 240 and well 242 dimensions, and the axial length of the valve shaft 240, among other factors, all may be relevant in determining the travel time of the valve 210 between the first and the second position. Therefore, configuring the geometry of the valve shaft 240 and well 242 to act as a damper is only one exemplary way of affecting the travel time, and other methods are contemplated as within the scope of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A dishwasher appliance, comprising:
a wash chamber for receipt of articles for washing;
a pump for providing fluid flow for cleaning the articles;
a diverter that receives fluid flow from the pump, the diverter comprising:
a plurality of outlet ports for providing fluid to the wash chamber;
a housing defining a chamber, the chamber fluidly connecting a fluid inlet and a fluid outlet such that a fluid may flow into the chamber through the fluid inlet and out of the chamber through the fluid outlet to one or more of the outlet ports, the housing also defining a cylindrically-shaped well;
a first ramped element positioned within a distal end of the well;
a valve positioned within the fluid outlet, rotatable about an axis, and movable along an axial direction between a first position and a second position, the valve defining radial and circumferential directions, the valve comprising:
a disk defining a plurality of apertures for selectively controlling fluid flow from the fluid outlet to one or more of the outlet ports, the apertures being spaced apart along a circumferential direction;
a cylindrically-shaped shaft connected to the disk and extending along the axial direction, the shaft slidably received within the well of the housing, the shaft defining an interior channel;
a plurality of cams positioned on the cylindrical shaft near the disk and projecting radially inward from the cylindrical shaft into the interior channel;
a second ramped element positioned near a distal end of the shaft;
a boss extending along the axial direction from the housing into the interior channel of the valve;
a plurality of guide elements positioned on the boss near the housing and extending radially outward from the boss; and
a biasing element extending between the boss and the valve and configured to urge the valve towards the first position,
wherein the first ramped element and the second ramped element are configured to contact each other when the valve moves into the first position so as to cause the valve to rotate into a base angular position, and
wherein the guide elements and the cams are configured to contact each other when the valve moves into the second position so as to cause the valve to rotate incrementally through a plurality of selected angular positions for fluid flow through one more outlet ports.

2. The dishwasher appliance of claim 1, wherein the disk is positioned within a path of fluid flow through the chamber such that valve is moved toward the second position by a predetermined rate of fluid flow through the fluid outlet of the chamber.

3. The dishwasher appliance of claim 1, wherein the boss defines a recess into which the biasing element is slidably received.

4. The dishwasher appliance of claim 3, wherein the biasing element comprises:
a plunger comprising a plunger shaft connected with a plunger head, the plunger head having a larger diameter than the plunger shaft; and
a spring received onto the plunger shaft and compressed against the plunger head.

5. The dishwasher appliance of claim 4, wherein the plunger head comprises a conically-shaped tip, and wherein the second ramped element further comprises a conically-shaped seat against which the conically-shaped tip is urged by the spring.

6. The dishwasher appliance of claim 1, wherein the well of the housing and the interior channel of the valve are in fluid communication with the chamber.

7. The dishwasher appliance of claim 1, wherein the housing comprises a first outlet port and a second outlet port and the disk comprises four apertures, and wherein the cams and the guide elements are configured to rotate the valve in 120 degree increments such that the first outlet port, the second outlet port, or both the first outlet port and the second outlet port are in fluid communication with the chamber.

8. The dishwasher appliance of claim 1, wherein the disk has a first face oriented towards the outlet ports and a second face oriented towards the well of the housing, and further comprising a plurality of arcuate ribs are disposed on the second face of the disk.

9. The dishwasher appliance of claim 1, wherein the housing comprises a first portion connected with a second portion, and further comprising a fluid seal between the first portion and the second portion.

10. The dishwasher appliance of claim 1, wherein the cams each comprise a triangular shaped projection, and
wherein each cam is spaced apart from adjacent cams along the circumferential direction, and each cam is at the same axial position along the axial direction.

11. The dishwasher appliance of claim 1, wherein the plurality of guide elements comprise:
   a plurality of lower guide elements, the lower guide elements comprising;
      a projection having at least one side that is parallel to the axial direction;
      an upper contact face extending from the at least one side and forming a non-zero, acute angle from the axial direction; and
      a lower contact face extending from the upper contact face and forming a non-zero, acute angle from the axial direction; and
   a plurality of upper guide elements, the upper guide elements comprising:
      a projection having a pair of straight sides that are parallel to the axial direction; and
      a connecting side extending between the pair of straight sides and forming a non-zero, acute angle from the axial direction.

12. A passive diverter for selectively controlling fluid flow in a dishwasher appliance, the passive diverter comprising:
   a plurality of outlet ports for providing fluid to a wash chamber;
   a housing defining a chamber, the chamber fluidly connecting a fluid inlet and a fluid outlet such that a fluid may flow into the chamber through the fluid inlet and out of the chamber through the fluid outlet to one or more of the outlet ports, the housing also defining a cylindrically-shaped well;
   a first ramped element positioned within a distal end of the well;
   a valve positioned within the fluid outlet, rotatable about an axis, and movable along an axial direction between a first position and a second position, the valve defining radial and circumferential directions, the valve comprising
      a disk defining a plurality of apertures for selectively controlling fluid flow from the fluid outlet to one or more of the outlet ports, the apertures being spaced apart along a circumferential direction;
      a cylindrically-shaped shaft connected to the disk and extending along the axial direction, the shaft slidably received within the well of the housing, the shaft defining an interior channel;
      a plurality of cams positioned on the cylindrical shaft near the disk and projecting radially inward from the cylindrical shaft into the interior channel;
      a second ramped element positioned near a distal end of the shaft;
   a boss extending along the axial direction from the housing into the interior channel of the valve;
   a plurality of guide elements positioned on the boss near the housing and extending radially outward from the boss; and
   a biasing element extending between the boss and the valve and configured to urge the valve towards the first position,
   wherein the first ramped element and the second ramped element are configured to contact each other when the valve moves into the first position so as to cause the valve to rotate into a base angular position,
   wherein the guide elements and the cams are configured to contact each other when the valve moves into the second position so as to cause the valve to rotate incrementally through a plurality of selected angular positions for fluid flow through one more outlet ports, and
   wherein the disk is positioned within a path of fluid flow through the chamber such that valve is moved toward the second position by a predetermined rate of fluid flow through the fluid outlet of the chamber.

13. The passive diverter of claim 12, wherein the boss defines a recess into which the biasing element is slidably received.

14. The passive diverter of claim 13, wherein the biasing element comprises:
   a plunger comprising a plunger shaft connected with a plunger head, the plunger head having a larger diameter than the plunger shaft; and
   a spring received onto the plunger shaft and compressed against the plunger head, and
   wherein the plunger head comprises a conically-shaped tip, and wherein the second ramped element further comprises a conically-shaped seat against which the conically-shaped tip is urged by the spring.

15. The passive diverter of claim 12, wherein the well of the housing and the interior channel of the valve are in fluid communication with the chamber.

16. The passive diverter of claim 12, wherein the housing comprises a first outlet port and a second outlet port and the disk comprises four apertures, and wherein the cams and the guide elements are configured to rotate the valve in 120 degree increments such that the first outlet port, the second outlet port, or both the first outlet port and the second outlet port are in fluid communication with the chamber.

17. The passive diverter of claim 12, wherein the disk has a first face oriented towards the outlet ports and a second face oriented towards the well of the housing, and further comprising a plurality of arcuate ribs are disposed on the second face of the disk.

18. The passive diverter of claim 12, wherein the housing comprises a first portion connected with a second portion, and further comprising a fluid seal between the first portion and the second portion.

19. The passive diverter of claim 12, wherein the cams each comprise
   a triangular shaped projection, and
   wherein each cam is spaced apart from adjacent cams along the circumferential direction, and each cam is at the same axial position along the axial direction.

20. The passive diverter of claim 12, wherein the plurality of guide elements comprise:
   a plurality of lower guide elements, the lower guide elements comprising;
      a projection having at least one side that is parallel to the axial direction;
      an upper contact face extending from the at least one side and forming a non-zero, acute angle from the axial direction; and
      a lower contact face extending from the upper contact face and forming a non-zero, acute angle from the axial direction; and
   a plurality of upper guide elements, the upper guide elements comprising:
      a projection having a pair of straight sides that are parallel to the axial direction; and
      a connecting side extending between the pair of straight sides and forming a non-zero, acute angle from the axial direction.

* * * * *